United States Patent
Mathew

[15] 3,638,810
[45] Feb. 1, 1972

[54] LOAD HANDLING VEHICLE

[72] Inventor: Leonard Stanley Mathew, Sutton Place Farm, Abinger Hammer near Dorking, Surrey, England

[22] Filed: May 8, 1969

[21] Appl. No.: 822,928

[30] Foreign Application Priority Data

May 13, 1968 Great Britain......................22,699/68

[52] U.S. Cl..............................214/75 G, 214/651, 214/674
[51] Int. Cl.........................................................B60p 1/52
[58] Field of Search....................214/75, 75 H, 651, 653, 95, 214/75 G, 674

[56] References Cited

UNITED STATES PATENTS

| | | | |
|---|---|---|---|
| 2,857,062 | 10/1958 | Anderson | 214/75 H |
| 3,010,594 | 11/1961 | Farmer | 214/653 |
| 2,831,588 | 4/1958 | Seed | 214/38.22 |

FOREIGN PATENTS OR APPLICATIONS

| | | | |
|---|---|---|---|
| 792,584 | 8/1968 | Canada | 214/75 |

*Primary Examiner*—Robert G. Sheridan
*Assistant Examiner*—George F. Abraham
*Attorney*—Wenderoth, Lind & Ponack

[57] ABSTRACT

A vehicle for handling a freight container, comprises a wheeled chassis, a carriage which is traversible on guide means across the width of the vehicle at or adjacent one end of the vehicle, a vertical mast structure mounted for rotation about a vertical axis on said carriage and a clamping frame for supporting a container by its upper corners and/or edges. The clamping frame is supported for up-and-down movement on the mast structure so that the clamping frame can be disposed to handle a container disposed beyond said one end and to either side of the vehicle, and the vehicle having a deck or equivalent supporting means on which a container can be placed by the clamping frame.

4 Claims, 4 Drawing Figures

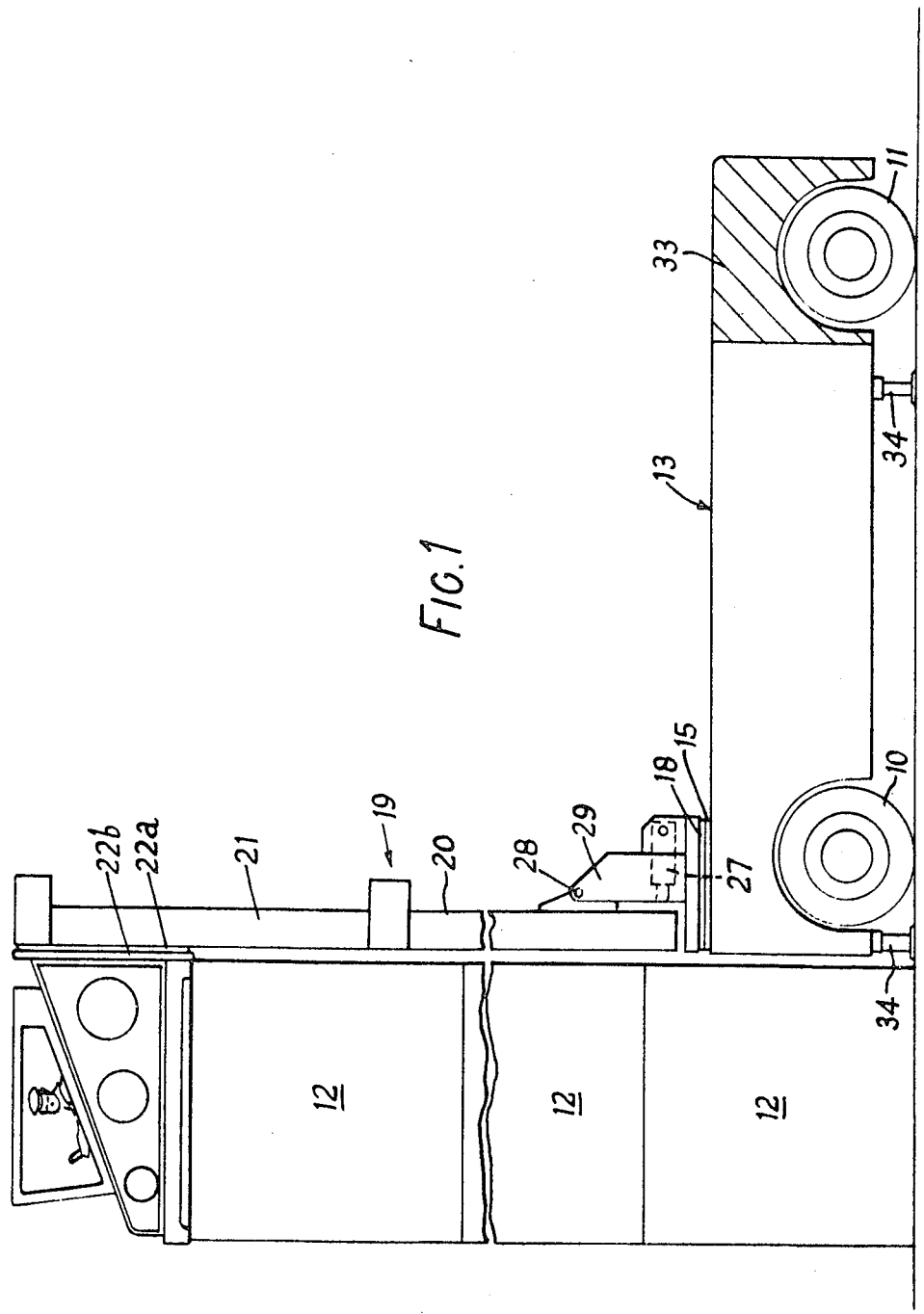

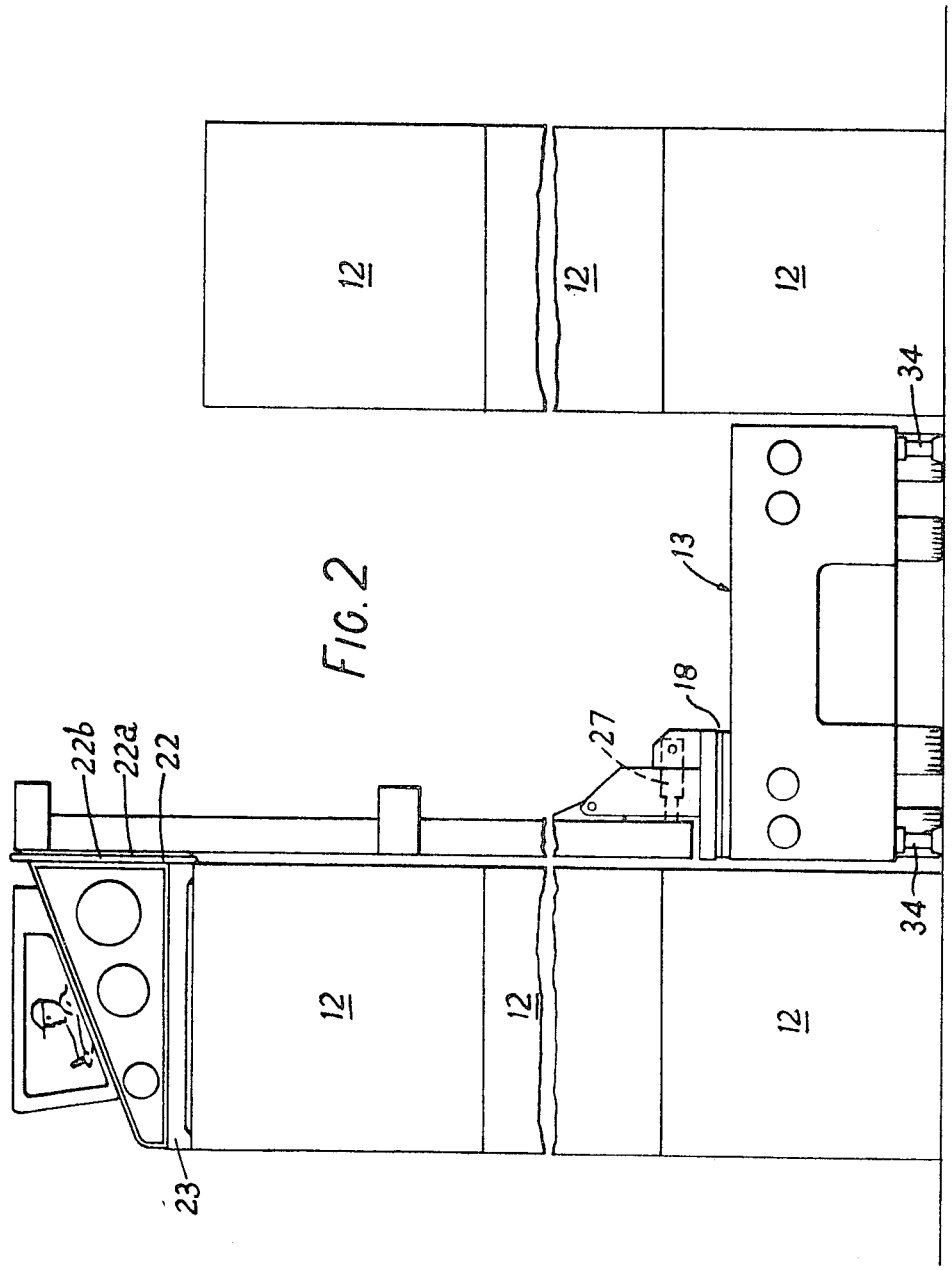

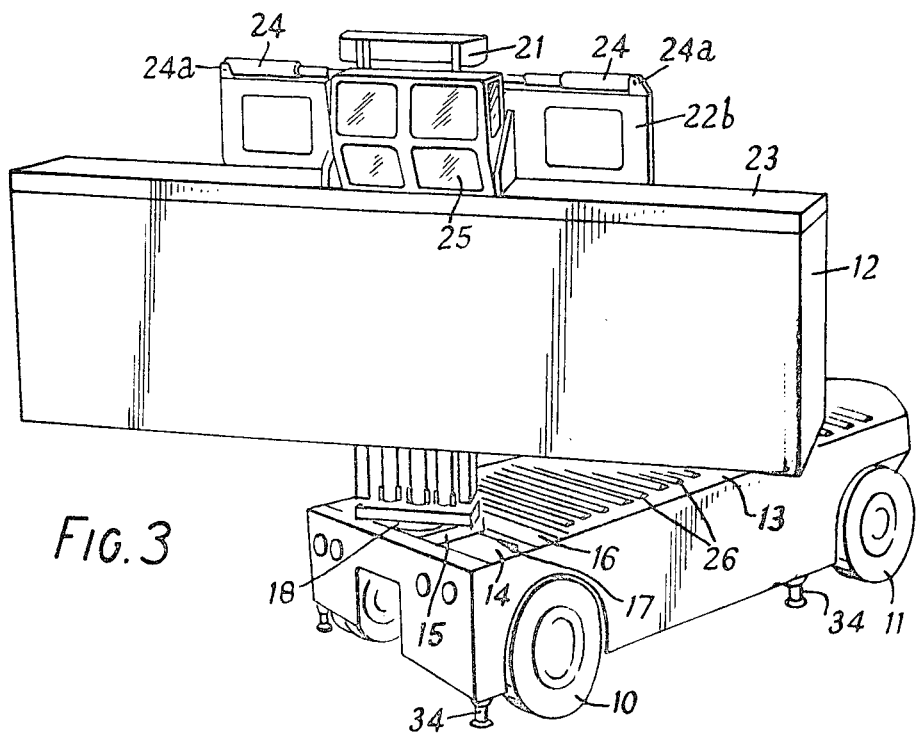
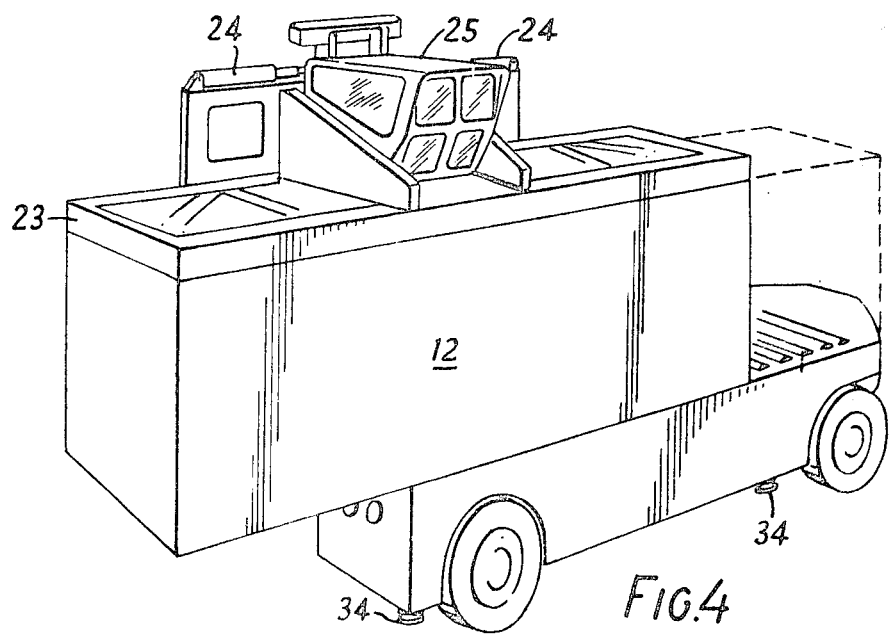

LOAD HANDLING VEHICLE

This invention relates to apparatus for handling freight containers, more particularly but not exclusively the international standard freight containers now in general use. These standard containers, which are 8 feet high by 8 feet wide and vary from 20 feet to 40 feet in length, present considerable handling problems by reason of their bulk and weight and because they are often stacked two or three containers high.

According to the present invention there is provided a vehicle for handling a freight container, comprising a wheeled chassis, a carriage which is traversible on guide means across the width of the vehicle at or adjacent one end of the vehicle, a vertical mast structure mounted for rotation about a vertical axis on said carriage, a clamping frame for supporting a container by its upper corners and/or edges, which clamping frame is supported for up-and-down movement on the mast structure so that the clamping frame can be disposed to handle a container disposed beyond said one end and to either side of the vehicle, and the vehicle having a deck or equivalent supporting means on which a container can be placed by the clamping frame. The mast structure will normally be vertically extensible.

According to a preferred feature of the invention, transfer means is provided for moving a container carried by the clamping frame longitudinally of the vehicle on or over said deck or equivalent supporting means.

The transfer means may comprise means for moving the clamping frame laterally relative to the mast structure, the supporting means comprising freely rotatable rollers on which the container can be rolled lengthwise of the vehicle by operation of said means for moving the clamping frame. Alternatively, the supporting means may comprise rollers extending transversely of the vehicle and spaced apart lengthwise of the vehicle, the transfer means comprising means for rotating the rollers selectively in either direction.

The invention will now be described in more detail with reference to the accompanying diagrammatic drawings in which is shown by way of example, a container handling vehicle incorporating the invention. In the drawings:

FIG. 1 shows the vehicle handling a container at the front of the vehicle,

FIG. 2 is an end view of the vehicle showing how it handles a load from either side, FIG. 3 is a perspective view showing how a container is slewed and traversed by the vehicle, and FIG. 4 illustrates how a container is moved on to the deck of the vehicle.

Referring to the drawings, and more particularly to FIG. 3, the vehicle has a chassis carried on front and rear wheels 10, 11 respectively, of which the rear wheels 11 are steerable. The illustrated vehicle is intended to handle containers 12 which comply with the standards laid down by the International Standards Organization. For carrying such a container some distance, the vehicle has a substantially flush deck 13 on which the container can be placed to extend lengthwise of the vehicle. Instead of a flush deck the vehicle could, if desired, have a horizontal framework to support a container.

Close to the front end of the vehicle a recess 14 extends across the top surface of the deck and a carriage 15 is mounted in this recess for movement from side to side of the vehicle. The carriage is mounted on rollers (not shown) which engage in channels 16 at the front and rear sides of the recess. For traversing the carriage 15 across the vehicle, a fixed rack 17 extends across the vehicle within the recess and is engaged by a motor driven pinion (not shown) mounted on the carriage, but a hydraulic ram may instead be used if desired. The carriage carries a turntable 18 on which is supported an extensible vertical mast structure 19 so that the mast structure can be swiveled about a vertical axis on the carriage. One suitable form of extensible mast structure is of the well known kind comprising a fixed guide frame 20, a moving guide frame 21 mounted for vertical guided movement on the fixed guide frame, a hydraulic jack (not shown) connected between the bottom of the stationary guide frame and the top of the moving guide frame, a load-carrying element mounted for vertical movement along the movable guide frame and chains (not shown) for hoisting the load-carrying element. These chains are anchored at one end to the fixed guide frame and extend over respective sprockets rotatably mounted in the upper end of the moving guide frame, and have their opposite ends secured to the load-carrying element, which in the present instance is constituted by a clamping frame support 22. As the hydraulic jack is extended, the moving guide frame 21 is raised along the fixed guide frame and the clamping frame support 22 is moved along the moving guide frame by the chains. The vertical speed of movement of the clamping frame support relative to the ground is thus twice that of the moving guide frame.

A clamping frame 23 of any known or convenient design is mounted on the clamping frame support 22. The clamping frame is operable to support a standard container 12 by its upper corner in known manner.

The clamping frame can be traversed laterally with respect to the moving guide frame 21 of the mast structure. In the illustrated construction, this is achieved by making the clamping frame support in two parts 22a, 22b, part 22a being supported by the aforesaid chains and being restrained against lateral movement relative to the moving guide frame 21, and the second part 22b being mounted on rollers in horizontal guides on the first part 22a for lateral movement on either side of a central position relative to the first part. The second part is restrained by the guides and rollers against movement relative to the first part in a vertical direction. Twin opposed horizontally arranged jacks 24 are provided to actuate the lateral movement of the clamping frame. Each jack 24 is pivotally connected between an anchorage 24a on the second part of the clamping frame support and an anchorage disposed at the opposite side of the first part. Thus operation of the jacks 24 traverses the clamping frame laterally with respect to the mast structure.

In the illustrated construction, the drivers compartment 25 is on top of the clamping frame, but it will be understood that this position, although convenient, is merely one of several possible positions.

Rollers 26 extending across the deck of the vehicle are recessed into the deck and are freely rotatable.

The rear end part of the vehicle includes a counterweight casting 33. Another counterweight (not shown) may be provided beneath the deck 13 of the vehicle for traversing across the width of the vehicle at a location between the centrally mounted engine and the rear fixed counterweight. This movable counterweight may be operable under the control of the driver, or may if preferred be arranged to be operated automatically so as always to be offset from the centerline of the vehicle by the same amount as, but in the opposite direction, to the carriage and mast structure.

At the four corners of the chassis, hydraulic jacks 34 having feet may be provided, the jacks being extensible to place the feet on the ground for additional stability of the vehicle during container-handling operations. These jacks are operable independently of each other to enable the vehicle as a whole to be tilted to a small extent, if desired, for example for producing small adjusting movements of the clamping frame without moving the vehicle as a whole.

Hydraulically operated jacks 27 are conveniently provided for tilting the mast structure through ±5° relative to the turntable, and for this purpose the fixed guide frame 20 is pivotally supported on trunnions 28 in bearings in base members 29 on the turntable 18, jacks 27 are pivotally connected between the foot of the fixed guide frame 20 and anchorages on the turntable. This provision also assists the driver in maneuvering the clamping frame without moving the vehicle as a whole.

The clamping frame cannot be lowered below about 7 feet from the ground and the height of the deck 13 is approximately 6 feet from the ground. The extension provided by the mast structure is appropriate to the height to which the containers are to be stacked, but it will readily be appreciated that the disposition of the mast structure on the deck at a substantial height above the ground and the use of a clamping frame which grips the container by its top reduces very substantially the necessary height of the mast structure itself.

When the vehicle is travelling without a load, the carriage is disposed at whichever side of the vehicle is convenient and the mast is turned so that the clamping frame is disposed over the length of the vehicle and the moving counterweight (where provided) is disposed on the centerline of the vehicle.

When a container is to be picked up from the front of the vehicle, the vehicle is positioned as shown in FIG. 1 with the front of the vehicle adjacent the side of the container, the mast structure having first been extended to raise the clamping frame 23 clear of the containers. When the container has been engaged by the clamping frame and lifted clear, the vehicle is reversed away from the stack. The container may be carried in this position, but if it is to be carried some distance it is preferred to deposit the container on the deck 13 of the vehicle. To do this, the carriage 15 is traversed to one side of the vehicle and is slewed to bring the container into lengthwise alignment with the deck 13. The container is lowered so that its weight rests on rollers 26 and the twin jacks 24 are then operated to move the container laterally (rearward) on the rollers to a suitable position. It is therefore preferred that the minimum width of the vehicle should be the width of a standard container plus the diameter of the turntable plus a clearance distance, as may be seen from FIG. 2.

Referring still to FIG. 2, to handle a container from the side, the vehicle is positioned parallel to the container and the clamping frame is raised and the turntable operated to bring the clamping frame over the container. When the container has been engaged and lifted clear, the container can if space permits be brought over the deck simply by rotation of the turntable through 180°. It will therefore be clear that the vehicle can operate in relatively narrow alleyways between rows of stacked containers.

It will be apparent from FIG. 2 that a container can be moved from one side of the alleyway to the other simply by transversing the carriage across the vehicle and rotating the mast structure through 180° by means of the turntable.

Instead of employing a two-part clamping frame support in conjunction with twin jacks, the transverse movement of the clamping frame may be achieved by mounting the turntable on the carriage through an intermediate platform which has a track enabling the turntable and mast structure to be moved lengthwise of the vehicle relative to the carriage. In another alternative arrangement, the jack and two-part clamping frame support is omitted and the rollers 26 are powered to be driven in unison in either direction to enable a load to be carried on the platform 13 of the vehicle, and means is provided for holding the container in position on the platform because the container has to be released from the clamping frame.

I claim:

1. A vehicle for handling a freight container, comprising a steerable, self-propelled, wheeled chassis having means defining a horizontal support on which a freight container can be placed so as to overhang one end of the vehicle, horizontal guide means fixedly mounted on the chassis below the level of the supporting means whereby movement of the container lengthwise of the vehicle on the support means is unobstructed by the guide means, which guide means extends horizontally across the width of the vehicle at said one end of the vehicle, a carriage mounted for traversing movement along the guide means, a vertical mast structure mounted for rotation about a vertical axis on said carriage, a clamping frame for supporting a container by its upper corners and/or edges, which clamping frame is supported for up-and-down movement on the mast structure so that the clamping frame can be disposed to handle a container disposed beyond said one end and to either side of the vehicle, transfer means provided for moving a container carried by the clamping frame longitudinally of the vehicle on or over said means defining a horizontal support, said supporting means comprising rollers extending transversely of the vehicle and spaced apart lengthwise of the vehicle, and said transfer means comprising means for rotating the rollers selectively in either direction, the rollers being disposed in the deck and having their upper portions projecting above said means defining a horizontal support.

2. A vehicle for handling a freight container, comprising a steerable, self-propelled, wheeled chassis having means defining a horizontal support on which a freight container can be placed so as to overhang one end of the vehicle, horizontal guide means fixedly mounted on the chassis below the level of the supporting means whereby movement of the container lengthwise of the vehicle on the support means is unobstructed by the guide means, which guide means extends horizontally across the width of the vehicle at said one end of the vehicle, a carriage mounted for traversing movement along the guide means, a vertical mast structure mounted for rotation about a vertical axis on said carriage, a clamping frame for supporting a container by its upper corners and/or edges, which clamping frame is supported for up-and-down movement on the mast structure so that the clamping frame can be disposed to handle a container disposed beyond said one end and to either side of the vehicle, and means provided for tilting said mast structure towards and away from a container positioned for engagement by said clamping frame.

3. A vehicle for handling a freight container, comprising a steerable, self-propelled, wheeled chassis having means defining a horizontal support on which a freight container can be placed so as to overhang one end of the vehicle, horizontal guide means fixedly mounted on the chassis below the level of the supporting means whereby movement of the container lengthwise of the vehicle on the support means is unobstructed by the guide means, which guide means extends horizontally across the width of the vehicle at said one end of the vehicle, a carriage mounted for traversing movement along the guide means, a vertical mast structure mounted for rotation about a vertical axis on said carriage, a clamping frame for supporting a container by its upper corners and/or edges, which clamping frame is supported for up-and-down movement on the mast structure so that the clamping frame can be disposed to handle a container disposed beyond said one end and to either side of the vehicle, and a counterweight movably mounted on said chassis at right angles to the length of the vehicle for counterbalancing the weight of the container.

4. A vehicle for handling a freight container, comprising a steerable, self-propelled, wheeled chassis having means defining a horizontal support on which a freight container can be placed so as to overhang one end of the vehicle, horizontal guide means fixedly mounted on the chassis below the level of the supporting means whereby movement of the container lengthwise of the vehicle on the support means is unobstructed by the guide means, which guide means extends horizontally across the width of the vehicle at said one end of the vehicle, a carriage mounted for traversing movement along the guide means, a vertical mast structure mounted for rotation about a vertical axis on said carriage, a clamping frame for supporting a container by its upper corners and/or edges, which clamping frame is supported for up-and-down movement on the mast structure so that the clamping frame can be disposed to handle a container disposed beyond said one end and to either side of the vehicle, and transfer means provided for moving a container carried by the clamping frame longitudinally of the vehicle on said means defining said horizontal support, said transfer means comprising means for moving the clamping frame laterally relative to the mast structure and wherein the means defining said horizontal support comprises freely rotatable rollers which extend transversely of the vehicle and on which the container can be roller lengthwise of the vehicle by operation of said means for moving the clamping frame.

* * * * *